UNITED STATES PATENT OFFICE.

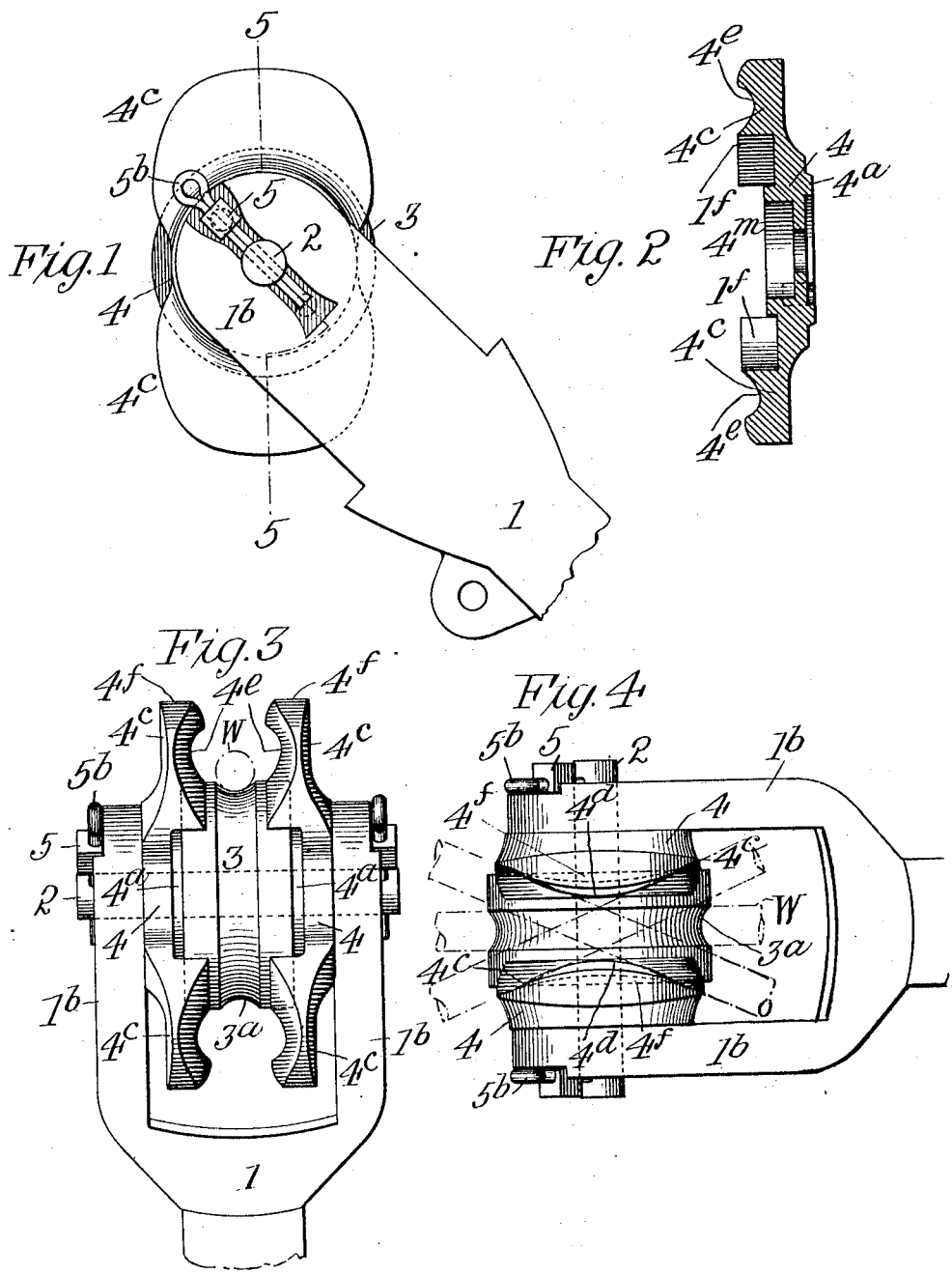

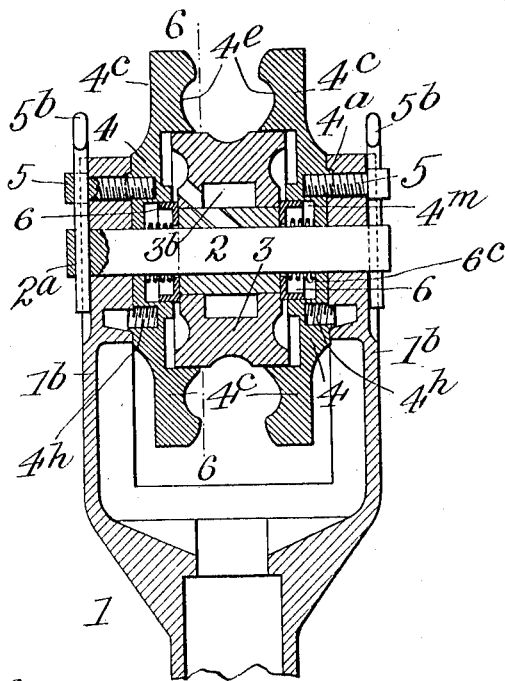
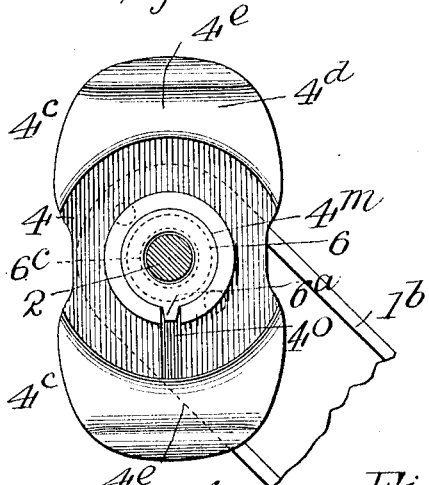
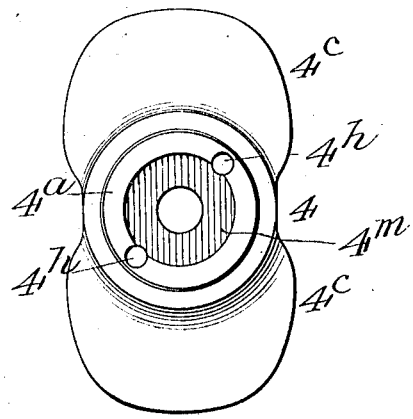
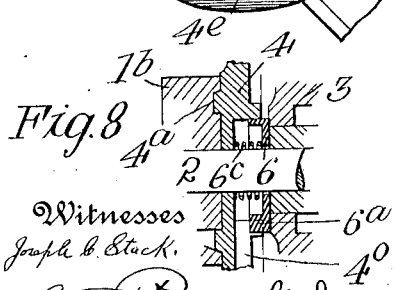
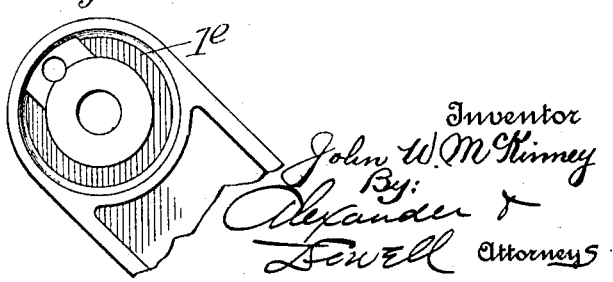

JOHN W. McKINNEY, OF TYRONE, PENNSYLVANIA.

TROLLEY.

1,055,205.  Specification of Letters Patent.  Patented Mar. 4, 1913.

Application filed March 25, 1912. Serial No. 685,940.

*To all whom it may concern:*

Be it known that I, JOHN W. McKINNEY, a resident of Tyrone, in the county of Blair and State of Pennsylvania, have invented certain new and useful Improvements in Trolleys; and I hereby declare that the following is a full, clear, and exact description thereof, reference being had to the accompanying drawings, which form part of this specification.

This invention is a novel improvement in trolleys for use on electric railways; and its object is to provide a trolley which will accurately follow the line with the least possible friction, will cross switches and frog-plates without jumping, and will reduce wear to a minimum. Also to provide a trolley for which the trolley-wheels can be easily renewed, and cheaply made; in which the rotating parts can be thoroughly lubricated; and in which the guiding parts will be renewable and adjustable independently of the wheel; and in which the current will be transmitted from the wire to the trolley pole with the least possible resistance and without sparking or arcing. In short to provide a trolley which will be more efficient in service, less expensive to maintain, and more effective and certain in operation than any of the trolleys heretofore used.

I will explain the invention in detail with reference to the accompanying drawings, and will summarize in the claims following the description of the trolley the essential features and combinations of parts wherein the invention resides and for which protection is desired; but while I have shown an efficient practical form of trolley embodying the invention I do not consider the invention restricted to the particular construction or proportions of parts shown in the drawings as these can be varied by the designer without departing from the essential novelty of the invention.

In said drawings—Figure 1 is a side view of the complete trolley head. Fig. 2 is a detail vertical section through one of the flanged castings. Fig. 3 is a rear view of the trolley shown in Fig. 1. Fig. 4 is a plan view of Fig. 1. Fig. 5 is an irregular vertical section on line 5—5, Fig. 1. Fig. 6 is a detail transverse section. Fig. 7 is an inner face view of one of the flanged castings. Fig. 8 is a detail section showing the electrical contact between the trolley and the casting. Fig. 9 is a detail inside view of one of the trolley bifurcations.

In the drawings 1 designates a trolley harp, which is substantially of the ordinary construction, and is adapted to be attached, preferably fixedly, to the trolley pole in the usual manner. The bifurcations $1^b$ of said harp support a shaft 2 on which the trolley wheel 3 is mounted. At opposite sides of the trolley wheel are two members, preferably brass castings, each of which has a central portion 4 provided with an axial opening for the passage of the shaft 2, and on its outer face with a shallow annular flange $4^a$ (Fig. 2) adapted to engage a corresponding annular groove $1^e$ (Fig. 9) in the inner face of the adjacent bifurcation of the trolley harp. Each casting 4 is preferably provided with diametrically opposite flanges $4^c$, and the inner face of the casting is recessed as at $1^f$, so that when the castings are in position relative to the wheel 3 the flanges $4^c$ project inwardly over the edges of the trolley wheel 3 as shown in the drawings, Figs. 3 and 5. The flanges $4^c$ of the opposite castings project above the top of the wheel 3 when the trolley harp or trolley is in normal operative position (see Figs. 1, 3 and 5) and extend for about one-fourth of the circumference of the wheel, and stand in the position that would be occupied by the flanges of an ordinary flanged trolley wheel if placed upon shaft 2. But in my invention instead of using a flanged trolley wheel I use a practically cylindric or plain surfaced trolley wheel 3 and provide stationary flanges $4^c$ (in the position which would be occupied by the flanges of an ordinary flanged wheel) to engage the trolley wire, the opposite flanges $4^c$ and the adjacent periphery of wheel 3 forming an eye or groove for engagement with the trolley wire W. The flanges $4^c$ are preferably rounded on their front and rear ends as shown so that there will be no liability of their catching a cross wire or the edge of a switch or frog.

The wheel 3 may be plane surfaced but preferably has a shallow central groove or depression $3^a$ between the flanges $4^c$ which will assist in guiding the wheel when the car is going along a straight track; but the flanges $4^c$ perform all the important guiding functions. These flanges $4^c$ would at any time have only a slight extent of surface contact with the trolley wire, (see Figs. 3 and 4), and as illustrated by dotted lines in Fig. 4 the flanges 4$^c$ will cause the trolley to accurately follow the wire even when the trolley pole is moving at quite an angle to the wire; the different angles being indicated by the different dotted portions of the wire in Fig. 4.

In practice when a car rounds a curve in the track the trolley is always given a twist or turn relative to the wire because the angle of the wire is different from the curve of the track which is followed by the trolley support; and this causes the trolley to turn relative to the wire; and where an ordinary grooved trolley wheel is used such wheel has a great tendency to jump or leave the wire; but my trolley, by reason of the stationary guide flanges 4$^c$ may turn at quite an angle to the wire without causing any undue friction or binding between the wire and the flanges 4$^c$. Preferably the inner face of each flange 4$^c$ is rounded off horizontally as indicated at 4$^d$ in Fig. 4, and is concaved vertically as at 4$^e$, Fig. 3, so that the narrowest part of the wire guide opening between the flanges is directly over the wheel, and such guide opening widens horizontally toward both front and rear of the trolley (see Fig. 4) and because of this widening out of the guide slot between the flanges 4$^c$ said flanges can guide the harp accurately around irregular curves or bends in the wire without danger of the wheel leaving the wire. Furthermore the upper or outermost portions of the flanges 4$^c$ are broadened or widened as shown at 4$^f$ so that when the flanges pass under a frog or switch plate the flanges will make a good broad and ample contact therewith, insuring a full supply of current from the frog or switch to the motor while the trolley is passing under such frog or switch without any arcing.

Owing to the shape of the flanges 4$^c$ when the harp passes under a switch or frog plate the flanges contact therewith and will readily follow the proper guides accurately and without jumping off; whereas an ordinary grooved trolley wheel tends to run off the frog or plate the wrong way.

By my invention I obtain all the advantages of the grooved trolley wheel and avoid all the disadvantages thereof, such as rolling friction between the wheel flanges and the trolley wire and the tendency of a flanged trolley to climb or roll off of a frog or switch or take an improper course when passing same; my stationary guide flanges also reduce frictional contact between the trolley and the wire, for when the trolley is running on a straight line there is no friction at all on the wire except the rolling contact between the periphery of the wheel 3 and the wire. And even if the wire momentarily contacts either guide flange 4$^c$ there is less rubbing or sliding contact therebetween than there would be between the wire and the flanges of a flanged trolley wheel of corresponding diameter.

The flange castings may be securely held in position by any suitable means. Preferably I secure each casting in place by means of a bolt 5 which is passed through a hole in the harp bifurcation as shown in Fig. 5 and tapped into a threaded opening 4$^h$ in the adjacent casting. And after this bolt is tightened, so as to lock the casting in place and draw it firmly against the inner face of the bifurcation, a cotter pin 5$^b$ is passed through an opening in the head of the bolt 5 and then through an opening 2$^a$ in the adjacent end of the shaft 2. This cotter pin both locks the bolt 5 against rotatory movement and also locks shaft 2 against longitudinal movement.

As a matter of economical construction and for the purpose of adjustability or reversibility of the castings, I preferably provide each casting with two diametrically opposite guide flanges 4$^c$; but in practice only one guide flange 4$^c$ (i. e., the uppermost) is in use at any time. But if such flange becomes worn or broken the casting can be reversed so as to bring the other flange into operative position.

When the castings are formed with two flanges as stated they may be provided with two threaded apertures 4$^h$ (Fig. 7) one adjacent each guide flange 4$^c$, either of which may be engaged by the bolt 5 so as to hold the related flange in working position. As above stated only one flange is in use at a time and the casting is simply made with two flanges so as to enable the casting to be readily shifted and to bring the unused flange into position for use in case a previously used flange should be injured or broken.

In the inner face of each casting and surrounding the shaft 2 is an annular chamber 4$^m$ in which is placed an annular contact-piece 6 which is loosely fitted on the shaft 2 and preferably cannot rotate with the wheel. To prevent the contact-piece rotating it may be provided with a lug 6$^a$ adapted to engage a corresponding slot or notch 4$^o$ in the related casting. Each contact-piece 6 is preferably made of brass and pressed inwardly into contact with the adjacent side of the wheel 3 by means of a suitable spring, which may be a helical spring 6$^c$ interposed between the contact-piece 6 and the bottom of the chamber 4$^m$.

It will be seen by reference to Figs. 5 and 8 that each contact-piece 6 has a large surface directly contacting with the side of the wheel 3, and that the electric current can pass directly from the wheel through these contact-pieces 6, springs 6$^c$ and the castings 4 to the harp 1, and thence to the trolley pole. These contacts and contacting surfaces are so ample that there will be no arcing or sparking between the wheel and shaft. The current does not have to be taken by the flanges 4$^c$, but if the flanges contact with the wire the current will be conducted directly to the harp.

It will be observed that the flanges 4$^c$ are concavo-convex at center both vertically, see Figs. 3 and 5, and also convex horizontally, see Fig. 4, so that, as above described, they form a kind of open guide-eye for the trolley wire; and if such wire contacts with the face of either flange owing to its peculiar curvature the face of the flange tends to direct the wire down to the wheel, or to cause the flange to climb up on the wire, and does not direct the wire out of the guide and away from the flanges as is the tendency of the flanges of ordinary flanged trolley wheels or V-shaped guides.

The wheel 3 is preferably made with an internal oil chamber 3$^b$ and with passages for supplying oil from the wheel direct to the shaft. The particular construction of this wheel however forms no part of the present invention, but it differs from the ordinary trolley wheel in that it has a practically flat periphery, and is not flanged; and has practicaly nothing to do with the guiding of the trolley.

My novel trolley has the advantages above stated, as demonstrated by practical use of the invention, of following the wire accurately and closely without jumping either at elevations, depressions, or curves, frogs, or switches in the line. These advantages are all due to the employment of the peculiar stationary guide flanges; while the wheel being rotatable avoids the objections to a sliding contact with the wire. The trolley is very durable and by providing the castings with double flanges as described the utility and life of the castings is practically doubled. Further the wheel being flangeless requires very much less metal in its formation, is much less expensive to manufacture and is much more durable; and it has no tendency to crawl up on the wire or run off in the wrong direction at a switch plate or frog; and such wheels can be obviously made more cheaply than the ordinary grooved trolley wheel; so when it becomes necessary to renew such plain wheels they are not as expensive as the ordinary trolley wheels. A further advantage of the stationary guide flanges is that they will clear ice and snow from the wire, and keep same clear; and the guide flanges work with less friction, less arcing, and supply current more uniformly to the motor than the ordinary wheeled trolley.

The contact pieces 6 have a comparatively large extent of rubbing surface contact with the wheel, and with the harp through the shaft spring, and tongue, which insures a uniform supply of current to the wheel and avoids arcing and sparking between the trolley and wire and in the trolley head.

What I claim is:

1. A trolley, comprising a harp, a wheel, a guide flange attached to the harp at each side of the wheel, each flange projecting above the wheel, and convexed horizontally and concaved vertically on its inner face.

2. In a trolley, the combination of a harp, a wheel, and guide flanges fixedly attached to the harp on opposite sides of the wheel, said flanges being convexed horizontally and concaved vertically on their opposed faces, substantially as described.

3. A trolley, comprising a harp, a shaft thereon, a wheel mounted on the shaft, a pair of flanged castings attached to the harp at opposite sides of the wheel, each casting having a flange projecting above the wheel at opposite sides thereof, said flanges having their inner faces convex horizontally and concaved vertically, and extending for about one-fourth the circumference of the wheel.

4. A trolley, comprising a harp, a pair of adjustable castings attached to said harp and provided with a plurality of projecting guide flanges, each guide flange being convexed horizontally and concaved vertically on its inner face, and a wheel mounted on said shaft intermediate the castings.

In testimony that I claim the foregoing as my own, I affix my signature in presence of two witnesses.

JOHN W. McKINNEY.

Witnesses:
RICHARD H. GILBERT, Jr.,
FRANK M. WARING.

---

Copies of this patent may be obtained for five cents each, by addressing the "Commissioner of Patents, Washington, D. C."